(12) United States Patent
Qin et al.

(10) Patent No.: US 11,323,222 B2
(45) Date of Patent: May 3, 2022

(54) COMMUNICATION METHOD, AND APPARATUS

(71) Applicant: Huawei Technologies Co., Ltd., Shenzhen (CN)

(72) Inventors: Yi Qin, Kista (SE); Shengyue Dou, Shanghai (CN); Peng Guan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 5 days.

(21) Appl. No.: 16/925,404

(22) Filed: Jul. 10, 2020

(65) Prior Publication Data

US 2020/0366433 A1  Nov. 19, 2020

Related U.S. Application Data

(63) Continuation of application No. PCT/CN2019/071185, filed on Jan. 10, 2019.

(30) Foreign Application Priority Data

Jan. 12, 2018 (CN) .......................... 201810032282.1

(51) Int. Cl.
 *H04W 24/10* (2009.01)
 *H04L 5/00* (2006.01)
 *H04B 7/06* (2006.01)

(52) U.S. Cl.
 CPC ......... *H04L 5/0048* (2013.01); *H04B 7/0626* (2013.01); *H04L 5/0053* (2013.01); *H04W 24/10* (2013.01)

(58) Field of Classification Search
 CPC ............... H04W 72/042; H04W 24/10; H04W 72/1289; H04W 72/0446; H04W 76/27;
 (Continued)

(56) References Cited

U.S. PATENT DOCUMENTS

2010/0002649 A1  1/2010  Teo et al.
2015/0023290 A1  1/2015  Tang et al.
(Continued)

FOREIGN PATENT DOCUMENTS

CN   105940699 A   9/2016
CN   107306177 A   10/2017
(Continued)

OTHER PUBLICATIONS

Samsung, "On PDCCH structure", 3GPP TSG RAN WG1 Meeting 90bis, R1-1717641, Prague, CZ, Oct. 9-13, 8 pages.
(Continued)

*Primary Examiner* — Eva Y Puente
(74) *Attorney, Agent, or Firm* — Slater Matsil, LLP

(57) ABSTRACT

This application provides a communication method and an apparatus. The communication method includes: receiving, by user equipment, first indication information from a network device, where the first indication information indicates a first resource; determining, by the user equipment, a second resource, where the second resource and the first resource belong to a same resource set configured by the network device, and the first resource and the second resource are used to transmit a first downlink reference signal; and receiving, by the user equipment on a third resource, a second signal and/or channel transmitted by using a third antenna port, where the third antenna port has a quasi co-location QCL relationship with a second antenna port used when the first downlink reference signal is transmitted on the second resource.

15 Claims, 5 Drawing Sheets

(58) Field of Classification Search
CPC ... H04W 72/046; H04W 80/02; H04W 24/08;
H04W 72/0453; H04W 74/0833; H04W
76/11; H04W 16/28; H04W 72/04; H04L
5/0048; H04L 5/0053; H04L 5/0051;
H04L 5/0023; H04L 5/001; H04L 5/0057;
H04L 5/0094; H04L 1/1861; H04L 5/00;
H04L 5/0092; H04L 1/0026; H04L 5/005;
H04L 5/0098; H04B 7/0626; H04B
7/0695; H04B 7/088; H04B 7/0632;
H04B 17/318; H04B 7/0456; H04B
7/0617; H04B 7/063; H04B 17/336;
H04B 7/024; H04B 7/0478; H04B
7/0639; H04B 7/022
USPC .......................................................... 370/329
See application file for complete search history.

(56) References Cited

U.S. PATENT DOCUMENTS

| | | | | |
|---|---|---|---|---|
| 2018/0262313 | A1* | 9/2018 | Nam | H04L 5/0044 |
| 2019/0261329 | A1* | 8/2019 | Park | H04L 5/0048 |
| 2019/0268088 | A1* | 8/2019 | Grant | H04B 7/0417 |
| 2020/0328792 | A1* | 10/2020 | Wei | H04B 7/0469 |
| 2020/0366388 | A1* | 11/2020 | Kakishima | H04W 24/10 |
| 2021/0218455 | A1* | 7/2021 | Park | H04B 7/0695 |

FOREIGN PATENT DOCUMENTS

| | | |
|---|---|---|
| CN | 107342840 A | 11/2017 |
| EP | 2914044 B1 | 8/2018 |
| WO | 2017165447 A1 | 9/2017 |
| WO | 2017171481 A1 | 10/2017 |

OTHER PUBLICATIONS

Huawei et al., "On NR-PDCCH structure", 3GPP TSG RAN WG1 Meeting #91, R1-1719386, Reno, NV, US, Nov. 27-Dec. 1, 2017, 7 pages.

3GPP TS 38.214 V1.2.0 (Nov. 2017), 3rd Generation Partnership Project; Technical Specification Group Radio Access Network; NR; Physical layer procedures for data (Release 15), 55 pages.

3GPP TS 38.214 V2.0.0 (Dec. 2017), 3rd Generation Partnership Project; Technical Specification Group Radio Access Network; NR; Physical layer procedures for data (Release 15), 71 pages.

Huawei et al., "Details of QCL assumptions and related RS design considerations", 3GPP TSG RAN WG1 Meeting #90bis, R1-1717309, Prague, Czech Republic, Oct. 9-13, 2017, 5 pages.

VIVO, "Remaining details on beam measurement and reporting", 3GPP TSG RAN WG1 Meeting #91, R1-1719769, Reno, NV, USA, Nov. 27-Dec. 1, 2017, 8 pages.

ITRI, "Discussion on beam indication", 3GPP TSG RAN WG1 Meeting 90bis, R1-1718075, Prague, Czech Republic, Oct. 9-13, 2017, 6 pages.

* cited by examiner

COMMUNICATION METHOD, AND APPARATUS

CROSS-REFERENCE TO RELATED APPLICATIONS

This application is a continuation of International Application No. PCT/CN2019/071185, filed on Jan. 10, 2019, which claims priority to Chinese Patent Application No. 201810032282.1, filed on Jan. 12, 2018. The disclosures of the aforementioned applications are hereby incorporated by reference in their entireties.

TECHNICAL FIELD

This application relates to the field of communications technologies, and in particular, to a communication method and an apparatus.

BACKGROUND

In a 5th generation (5G) mobile communications system, user equipment (UE) may communicate with a network side by using different receive beams or transmit beams. For example, the base station may configure a plurality of resources for a channel sounding reference signal (CSI-RS). The UE may receive the CSI-RS by using different receive beams, obtain channel state information after measurement, and feed back the channel state information to the base station. The base station indicates, to the UE based on the obtained channel state information, a UE side transmit beam or an antenna port used for sending.

In the foregoing solution, the base station needs to learn of a resource corresponding to a receive beam on which the UE obtains a best measurement result. However, in some scenarios, the UE does not report an identifier of the resource corresponding to the best measurement result. In this case, the transmit beam or the antenna port indicated by the base station to the UE may not be optimal.

SUMMARY

In view of this, this application provides an information transmission method and an apparatus, to better indicate a beam or an antenna port.

According to a first aspect, a communication method is provided. The communication method includes: receiving, by user equipment, first indication information from a network device, where the first indication information indicates a first resource; determining, by the user equipment, a second resource, where the second resource and the first resource belong to a same resource set configured by the network device, and the first resource and the second resource are used to transmit a first downlink reference signal; and receiving, by the user equipment on a third resource, a second signal and/or channel transmitted by using a third antenna port, where the third antenna port has a quasi co-location QCL relationship with a second antenna port used when the first downlink reference signal is transmitted on the second resource.

In the foregoing solution, the user equipment autonomously selects a downlink reference signal resource, and uses, during subsequent information transmission, an antenna port that has the QCL relationship with an antenna port corresponding to the autonomously selected downlink reference signal resource. This improves information receiving performance.

In the foregoing solution, that the user equipment determines the second resource and receives the second signal and/or channel may alternatively be that the user equipment independently determines a QCL assumption of the third antenna port to be used when the user equipment transmits the second signal and/or channel on the third resource.

With reference to the first aspect, in a first possible implementation, the first indication information is further used to indicate a QCL type, the QCL type includes a spatial receive end parameter, and a type of the QCL relationship is the QCL type.

With reference to the first aspect or the first possible implementation of the first aspect, in a second possible implementation, the receiving, by user equipment, first indication information from a network device includes: receiving, by the user equipment from the network device, transmission configuration indicator TCI configuration information that indicates a TCI state set to the user equipment, where the TCI state corresponds to at least one resource of the first downlink reference signal; and receiving, by the user equipment, TCI indication information from the network device, where the TCI indication information indicates one TCI state in the TCI state set, and the TCI state corresponds to the first resource.

With reference to the second possible implementation of the first aspect, in a third possible implementation, the first indication information includes an identifier of the resource set to which the first resource belongs and a resource identifier of the first resource in the resource set.

With reference to the second or the third possible implementation of the first aspect, in a fourth possible implementation, that the third antenna port has a QCL relationship with the second antenna port includes: the third antenna port has the QCL relationship with an antenna port used when the user equipment last transmits or measures the first downlink reference signal on the second resource before the user equipment receives the TCI configuration information; the third antenna port has the QCL relationship with an antenna port used when the user equipment last transmits or measures the first downlink reference signal on the second resource before the user equipment receives the TCI indication information; or the third antenna port has the QCL relationship with an antenna port used when the user equipment last transmits or measures the first downlink reference signal on the second resource before the user equipment receives the second signal and/or channel.

According to a second aspect, a communication method is provided. The communication method includes: sending, by a network device, first indication information to user equipment, where the first indication information indicates a first resource, so that the user equipment determines a second resource, where the second resource and the first resource belong to a same resource set configured by the network device, and the first resource and the second resource are used to transmit a first downlink reference signal; and sending, by the network device, a second signal and/or channel to the user equipment on a third resource by using a third antenna port, where the third antenna port has a quasi co-location (QCL) relationship with a second antenna port used when the first downlink reference signal is transmitted on the second resource.

With reference to the second aspect, in a first possible implementation, the first indication information is further used to indicate a QCL type, the QCL type includes a spatial receive end parameter, and a type of the QCL relationship is the QCL type.

With reference to the second aspect or the first possible implementation of the second aspect, in a second possible implementation, the sending, by a network device, first indication information to the user equipment includes: sending, by the network device to the user equipment, transmission configuration indicator TCI configuration information that indicates a TCI state set to the user equipment, where the TCI state corresponds to at least one resource of the first downlink reference signal; and sending, by the network device, TCI indication information to the user equipment, where the TCI indication information indicates one TCI state in the TCI state set, and the TCI state corresponds to the first resource.

With reference to the second possible implementation of the second aspect, in a third possible implementation, the first indication information includes an identifier of the resource set to which the first resource belongs and a resource identifier of the first resource in the resource set.

With reference to the second or the third possible implementation of the second aspect, in a fourth possible implementation, that the third antenna port has a QCL relationship with the second antenna port includes: the third antenna port has the QCL relationship with an antenna port used when the user equipment last transmits or measures the first downlink reference signal on the second resource before the user equipment receives the TCI configuration information; the third antenna port has the QCL relationship with an antenna port used when the user equipment last transmits or measures the first downlink reference signal on the second resource before the user equipment receives the TCI indication information; or the third antenna port has the QCL relationship with an antenna port used when the user equipment last transmits or measures the first downlink reference signal on the second resource before the user equipment receives the second signal and/or channel.

According to a third aspect, user equipment is provided. The user equipment includes: a receiver, configured to receive first indication information from a network device, where the first indication information indicates a first resource; and a processor, configured to determine a second resource, where the second resource and the first resource belong to a same resource set configured by the network device, and the first resource and the second resource are used to transmit a first downlink reference signal, where the receiver is further configured to receive, on a third resource, a second signal and/or channel transmitted by using a third antenna port, where the third antenna port has a quasi co-location QCL relationship with a second antenna port used when the first downlink reference signal is transmitted on the second resource.

With reference to the third aspect, in a first possible implementation, the first indication information is further used to indicate a QCL type, the QCL type includes a spatial receive end parameter, and a type of the QCL relationship is the QCL type.

With reference to the third aspect or the first possible implementation of the third aspect, in a second possible implementation, that the receiver is configured to receive first indication information from the network device includes: the receiver is configured to receive, from the network device, transmission configuration indicator TCI configuration information that indicates a TCI state set to the user equipment, where the TCI state corresponds to at least one resource of the first downlink reference signal; and the receiver is further configured to receive TCI indication information from the network device, where the TCI indication information indicates one TCI state in the TCI state set, and the TCI state corresponds to the first resource.

With reference to the second possible implementation of the third aspect, in a third possible implementation, the first indication information includes an identifier of the resource set to which the first resource belongs and a resource identifier of the first resource in the resource set.

With reference to the second or the third possible implementation of the third aspect, in a fourth possible implementation, that the third antenna port has a QCL relationship with the second antenna port includes: the third antenna port has the QCL relationship with an antenna port used when the user equipment last transmits or measures the first downlink reference signal on the second resource before the user equipment receives the TCI configuration information; the third antenna port has the QCL relationship with an antenna port used when the user equipment last transmits or measures the first downlink reference signal on the second resource before the user equipment receives the TCI indication information; or the third antenna port has the QCL relationship with an antenna port used when the user equipment last transmits or measures the first downlink reference signal on the second resource before the user equipment receives the second signal and/or channel.

According to a fourth aspect, a network device is provided. The network device includes: a processor, configured to generate first indication information, where the first indication information indicates a first resource; and a transmitter, configured to send the first indication information to user equipment, so that the user equipment determines a second resource, where the second resource and the first resource belong to a same resource set configured by the network device, and the first resource and the second resource are used to transmit a first downlink reference signal, where the transmitter is further configured to send a second signal and/or channel to the user equipment on a third resource by using a third antenna port, where the third antenna port has a quasi co-location QCL relationship with a second antenna port used when the first downlink reference signal is transmitted on the second resource.

With reference to the fourth aspect, in a first possible implementation, the first indication information is further used to indicate a QCL type, the QCL type includes a spatial receive end parameter, and a type of the QCL relationship is the QCL type.

With reference to the fourth aspect or the first possible implementation of the fourth aspect, in a second possible implementation, that the transmitter is configured to send the first indication information to the user equipment includes: the transmitter is configured to send, to the user equipment, transmission configuration indicator TCI configuration information that indicates a TCI state set to the user equipment, where the TCI state corresponds to at least one resource of the first downlink reference signal; and the transmitter is further configured to send TCI indication information to the user equipment, where the TCI indication information indicates one TCI state in the TCI state set, and the TCI state corresponds to the first resource.

With reference to the second possible implementation of the fourth aspect, in a third possible implementation, the first indication information includes an identifier of the resource set to which the first resource belongs and a resource identifier of the first resource in the resource set.

With reference to the second or the third possible implementation of the fourth aspect, in a fourth possible implementation, that the third antenna port has a QCL relationship with the second antenna port includes: the third antenna port has the QCL relationship with an antenna port used when the user equipment last transmits or measures the first downlink reference signal on the second resource before the user equipment receives the TCI configuration information; the third antenna port has the QCL relationship with an antenna port used when the user equipment last transmits or measures the first downlink reference signal on the second resource before the user equipment receives the TCI indication information; or the third antenna port has the QCL relationship with an antenna port used when the user equipment last transmits or measures the first downlink reference signal on the second resource before the user equipment receives the second signal and/or channel.

According to a fifth aspect, a communication method is provided. The communication method includes: receiving, by user equipment, first indication information from a network device, where the first indication information indicates a first resource; determining, by the user equipment, a second resource, where the second resource and the first resource belong to a same resource set configured by the base station, and the second resource and the first resource are used to transmit a first downlink reference signal; and sending, by the user equipment, a second channel and/or signal on a third resource, where a spatial domain transmission filter used when the user equipment sends the second channel and/or signal is the same as a spatial domain transmission filter used when the user equipment receives the first downlink reference signal on the second resource.

In the foregoing solution, the user equipment autonomously selects a downlink reference signal resource, and uses, during subsequent information sending, a spatial domain transmission filter that is the same as a spatial domain transmission filter used when the user equipment receives the downlink reference signal on the selected downlink reference signal resource. This improves information transmission performance.

In the foregoing solution, that the user equipment determines the second resource and sends the second channel and/or signal may alternatively be that the user equipment independently determines a transmit beam or a spatial domain transmission filter to be used when the user equipment transmits the second signal and/or channel on the third resource.

With reference to the fifth aspect, in a first possible implementation, the receiving, by user equipment, first indication information from a network device includes: receiving, by the user equipment from the network device, first configuration information that indicates the resource set of the first downlink reference signal to the user equipment; and receiving, by the user equipment, second configuration information from the network device, where the second configuration information indicates the first resource in the resource set.

With reference to the first possible implementation of the fifth aspect, in a second possible implementation, the second configuration information includes an identifier of the resource set and a resource identifier of the first downlink reference signal in the resource set.

With reference to the first or the second possible implementation of the fifth aspect, in a third possible implementation, that a spatial domain transmission filter used when the user equipment sends the second channel and/or signal is the same as a spatial domain transmission filter used when the user equipment receives the first downlink reference signal on the second resource includes: the spatial domain transmission filter used when the user equipment sends the second channel and/or signal is the same as a spatial domain transmission filter used when the user equipment last transmits or measures the first downlink reference signal on the second resource before the user equipment receives the first configuration information; the spatial domain transmission filter used when the user equipment sends the second channel and/or signal is the same as a spatial domain transmission filter used when the user equipment last transmits or measures the first downlink reference signal on the second resource before the user equipment receives the second configuration information; or the spatial domain transmission filter used when the user equipment sends the second channel and/or signal is the same as a spatial domain transmission filter used when the user equipment last transmits or measures the first downlink reference signal on the second resource before the user equipment sends the second channel and/or signal.

According to a sixth aspect, a communication method is provided. The communication method includes: sending, by a network device, first indication information to user equipment, where the first indication information indicates a first resource, so that the user equipment determines a second resource, where the second resource and the first resource belong to a same resource set configured by the base station, and the second resource and the first resource are used to transmit a first downlink reference signal; and receiving, by the network device, a second channel and/or signal sent by the user equipment on a third resource, where a spatial domain transmission filter used when the user equipment sends the second channel and/or signal is the same as a spatial domain transmission filter used when the user equipment receives the first downlink reference signal on the second resource.

With reference to the sixth aspect, in a first possible implementation, the sending, by a network device, first indication information to the user equipment includes: sending, by the network device to the user equipment, first configuration information that indicates the resource set of the first downlink reference signal to the user equipment; and sending, by the network device, second configuration information to the user equipment, where the second configuration information indicates the first resource in the resource set.

With reference to the first possible implementation of the sixth aspect, in a second possible implementation, the second configuration information includes an identifier of the resource set and a resource identifier of the first downlink reference signal in the resource set.

With reference to the first or the second possible implementation of the sixth aspect, in a third possible implementation, that a spatial domain transmission filter used when the user equipment sends the second channel and/or signal is the same as a spatial domain transmission filter used when the user equipment receives the first downlink reference signal on the second resource includes: the spatial domain transmission filter used when the user equipment sends the second channel and/or signal is the same as a spatial domain transmission filter used when the user equipment last transmits or measures the first downlink reference signal on the second resource before the user equipment receives the first configuration information; the spatial domain transmission filter used when the user equipment sends the second channel and/or signal is the same as a spatial domain transmission filter used when the user equipment last transmits or measures the first downlink reference signal on the second resource before the user equipment receives the second configuration information; or the spatial domain transmission filter used when the user equipment sends the second channel and/or signal is the same as a spatial domain transmission filter used when the user equipment last transmits or measures the first downlink reference signal on the second resource before the user equipment sends the second channel and/or signal.

According to a seventh aspect, user equipment is provided. The user equipment includes: a receiver, configured to receive first indication information from a network device, where the first indication information indicates a first resource; a processor, configured to determine a second resource, where the second resource and the first resource belong to a same resource set configured by the base station, and the second resource and the first resource are used to transmit a first downlink reference signal; and a transmitter, configured to send a second channel and/or signal on a third resource, where a spatial domain transmission filter used when the user equipment sends the second channel and/or signal is the same as a spatial domain transmission filter used when the user equipment receives the first downlink reference signal on the second resource.

With reference to the seventh aspect, in a first possible implementation, that the receiver is configured to receive first indication information from a network device includes: the receiver is configured to receive, from the network device, first configuration information that indicates the resource set of the first downlink reference signal to the user equipment; and the receiver is further configured to receive second configuration information from the network device, where the second configuration information indicates the first resource in the resource set.

With reference to the first possible implementation of the seventh aspect, in a second possible implementation, the second configuration information includes an identifier of the resource set and a resource identifier of the first downlink reference signal in the resource set.

With reference to the first or the second possible implementation of the seventh aspect, in a third possible implementation, that a spatial domain transmission filter used when the user equipment sends the second channel and/or signal is the same as a spatial domain transmission filter used when the user equipment receives the first downlink reference signal on the second resource includes: the spatial domain transmission filter used when the user equipment sends the second channel and/or signal is the same as a spatial domain transmission filter used when the user equipment last transmits or measures the first downlink reference signal on the second resource before the user equipment receives the first configuration information; the spatial domain transmission filter used when the user equipment sends the second channel and/or signal is the same as a spatial domain transmission filter used when the user equipment last transmits or measures the first downlink reference signal on the second resource before the user equipment receives the second configuration information; or the spatial domain transmission filter used when the user equipment sends the second channel and/or signal is the same as a spatial domain transmission filter used when the user equipment last transmits or measures the first downlink reference signal on the second resource before the user equipment sends the second channel and/or signal.

According to an eighth aspect, a network device is provided. The network device includes: a transmitter, configured to send first indication information to user equipment, where the first indication information indicates a first resource, so that the user equipment determines a second resource, where the second resource and the first resource belong to a same resource set configured by the base station, and the second resource and the first resource are used to transmit a first downlink reference signal; and a receiver, configured to receive a second channel and/or signal sent by the user equipment on a third resource, where a spatial domain transmission filter used when the user equipment sends the second channel and/or signal is the same as a spatial domain transmission filter used when the user equipment receives the first downlink reference signal on the second resource.

With reference to the eighth aspect, in a first possible implementation, that the transmitter is configured to send first indication information to the user equipment includes: the transmitter is configured to send, to the user equipment, first configuration information that indicates the resource set of the first downlink reference signal to the user equipment; and the transmitter is further configured to send second configuration information to the user equipment, where the second configuration information indicates the first resource in the resource set.

With reference to the first possible implementation of the eighth aspect, in a second possible implementation, the second configuration information includes an identifier of the resource set and a resource identifier of the first downlink reference signal in the resource set.

With reference to the first or the second possible implementation of the eighth aspect, in a third possible implementation, that a spatial domain transmission filter used when the user equipment sends the second channel and/or signal is the same as a spatial domain transmission filter used when the user equipment receives the first downlink reference signal on the second resource includes: the spatial domain transmission filter used when the user equipment sends the second channel and/or signal is the same as a spatial domain transmission filter used when the user equipment last transmits or measures the first downlink reference signal on the second resource before the user equipment receives the first configuration information; the spatial domain transmission filter used when the user equipment sends the second channel and/or signal is the same as a spatial domain transmission filter used when the user equipment last transmits or measures the first downlink reference signal on the second resource before the user equipment receives the second configuration information; or the spatial domain transmission filter used when the user equipment sends the second channel and/or signal is the same as a spatial domain transmission filter used when the user equipment last transmits or measures the first downlink reference signal on the second resource before the user equipment sends the second channel and/or signal.

In a possible design, the network device provided in this application may include a corresponding module configured to perform behavior of the network device in the foregoing method designs. The module may be software and/or hardware.

In a possible design, a function of the foregoing network device may be implemented by using one or more chips.

In a possible design, the user equipment provided in this application may include a corresponding module configured to perform behavior of the terminal in the foregoing method designs. The module may be software and/or hardware.

In a possible design, a function of the foregoing user equipment may be implemented by using one or more chips.

According to another aspect of this application, a computer-readable storage medium is provided. The computer-readable storage medium stores an instruction, and when the instruction is run on a computer, the computer is enabled to perform the method in the foregoing aspects.

According to another aspect of this application, a computer program product including an instruction is provided. When the computer program product runs on a computer, the computer is enabled to perform the method in the foregoing aspects.

BRIEF DESCRIPTION OF THE DRAWINGS

The following briefly describes the accompanying drawings required for describing the embodiments.

DETAILED DESCRIPTION OF ILLUSTRATIVE EMBODIMENTS

The following describes embodiments of the present invention in detail with reference to the accompanying drawings. A network architecture and a service scenario described in the embodiments of the present invention are intended to describe the technical solutions in the embodiments of the present invention more clearly, and do not constitute a limitation on the technical solutions provided in the embodiments of the present invention. A person of ordinary skill in the art may know that: With evolution of the network architecture and emergence of new service scenarios, the technical solutions provided in the embodiments of the present invention are also applicable to similar technical problems.

Figure 1:
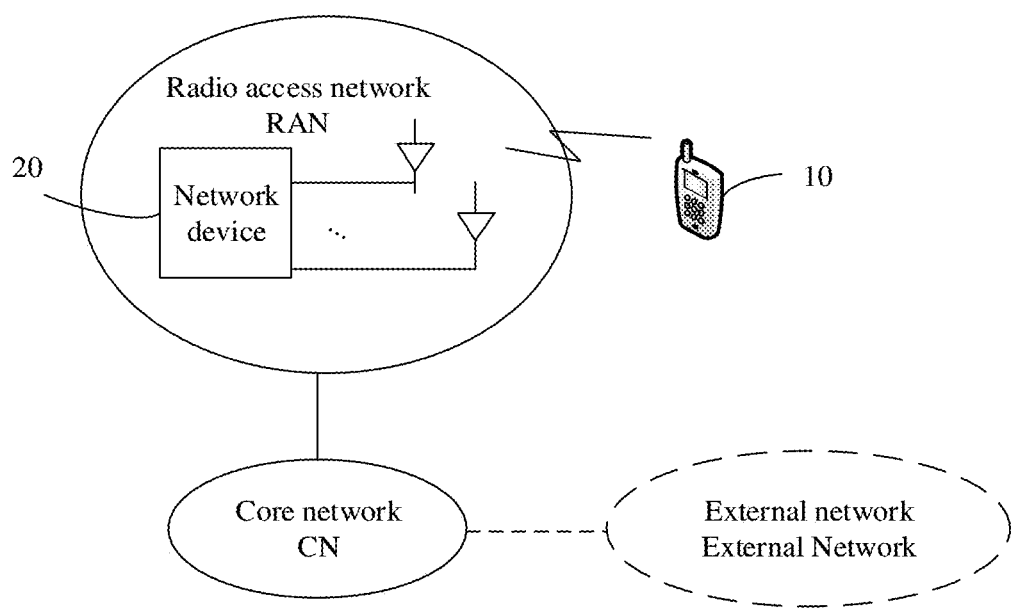
FIG. 1 is a schematic structural diagram of a possible system for implementing an embodiment of the present invention.

FIG. 1 is a schematic diagram of a possible system network according to this application. As shown in FIG. 1, at least one terminal 10 communicates with a radio access network (RAN for short). The RAN includes at least one network device 20. For clarity, only one network device and one user equipment UE are shown in the figure. The RAN is connected to a core network (CN for short). Optionally, the CN may be coupled to one or more external networks such as Internet Internet and a public switched telephone network (PSTN for short).

To facilitate understanding, the following describes some terms in this application.

In this application, the terms "network" and "system" are usually interchangeably used, but a person skilled in the art can understand meanings of the terms. User equipment (English: User Equipment, UE for short) is a terminal device having a communication function, may also be referred to as a terminal, and may include a handheld device, a vehicle-mounted device, a wearable device, or a computing device that has a wireless communication function, another processing device connected to a wireless modem, and the like. The user equipment may have different names in different networks, for example, a terminal, a mobile station, a subscriber unit, a station, a cellular phone, a personal digital assistant, a wireless modem, a wireless communications device, a handheld device, a laptop computer, a cordless telephone set, and a wireless local loop station. For ease of description, in this application, these devices are briefly referred to as user equipment UE or terminals. A network device may be a base station (base station, BS for short), a radio access device in a cloud network, or a device having wireless sending and receiving functions such as a relay station. The base station may also be referred to as a base station device, and is a network device deployed in a radio access network and configured to provide a wireless communication function. The base station may have different names in different wireless access systems. For example, the base station is referred to as a NodeB in a universal mobile telecommunications system (UMTS for short) network, the base station is referred to as an evolved NodeB (eNB or eNodeB for short) in an LTE network, and the base station may be referred to as a transmission reception point (TRP), a network node, or a gNodeB (gNB) in a future 5G system. Optionally, the network device in embodiments of the present invention may alternatively be user equipment in device-to-device (D2D). Optionally, the network device and the user equipment in embodiments of the present invention may alternatively be relay devices, or a network device and user equipment that implement a relay function.

A beam in this application may also be referred to as a spatial domain transmission filter. Optionally, a transmit beam may be referred to as a spatial domain transmit filter, and a receive beam may be referred to as a spatial domain receive filter.

In this application, an identifier of a resource may be an identifier of a reference signal transmitted on the resource, for example, a reference signal identity (RS ID).

Figure 2:
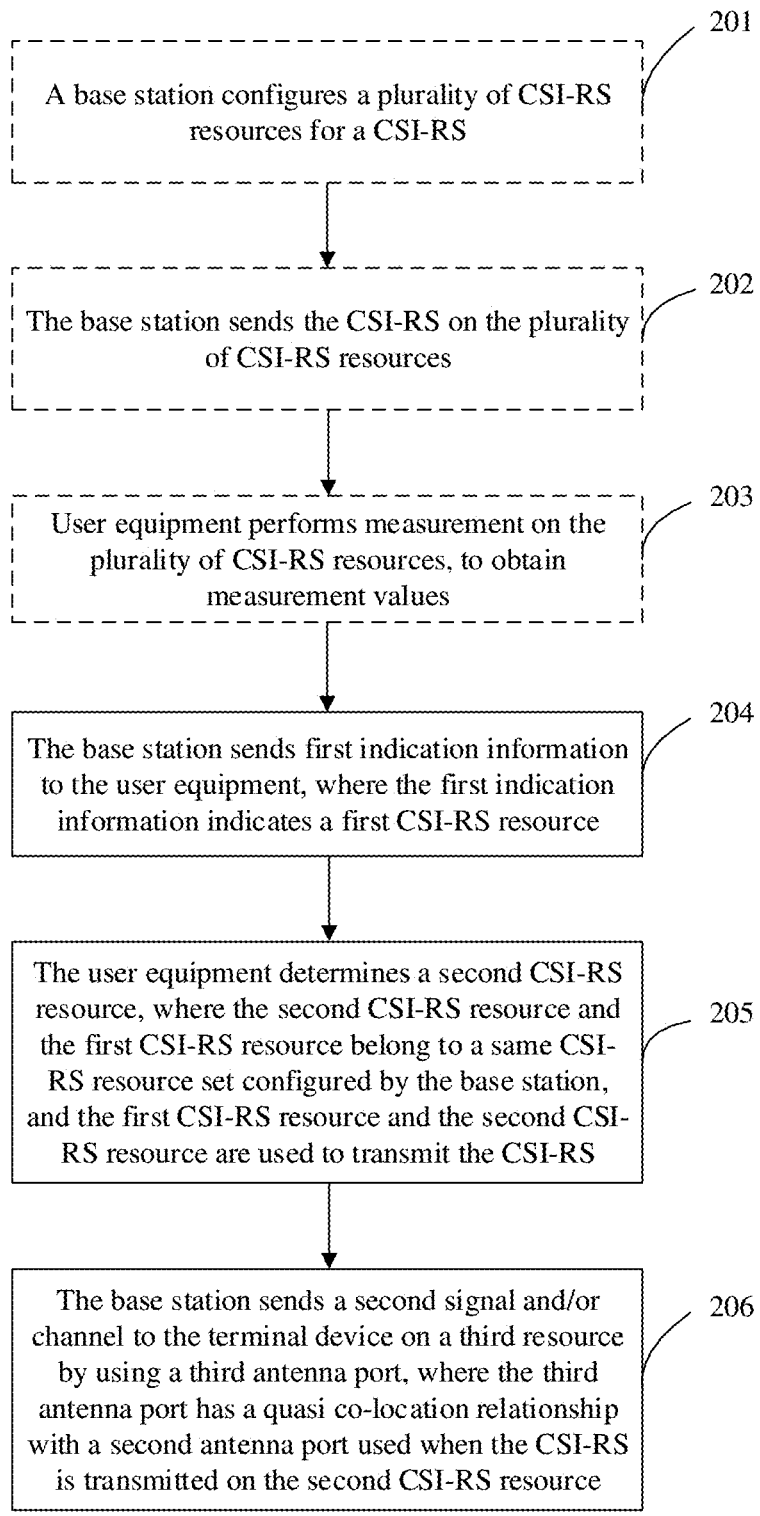
FIG. 2 is a flowchart of a communication method according to an embodiment of the present invention.

An embodiment of the present invention provides a communication method. The method may be applied to the system shown in FIG. 1. The following describes the method by using an example in which a base station communicates with user equipment, and a downlink reference signal is a CSI-RS. As shown in FIG. 2, the method includes the following steps.

Step 201: The base station configures a plurality of CSI-RS resources for the CSI-RS.

The base station may configure the CSI-RS resources by configuring a CSI-RS resource set, and one CSI-RS resource set includes at least one CSI-RS resource. A CSI-RS resource may be a resource of a non-zero power CSI-RS or a resource of a zero power CSI-RS.

The base station may further configure a CSI resource setting, used to configure one or more CSI-RS resource sets.

The base station may further configure a CSI reporting setting, used to configure a reporting manner or reported content of measurement information reported by the user equipment.

The base station may further configure a measurement link, used to configure a correspondence between the CSI reporting setting and the CSI resource setting, a measurement type (such as interference measurement or channel measurement), and the like.

Step 202: The base station sends the CSI-RS on the plurality of CSI-RS resources.

When the base station sends the CSI-RS, each CSI-RS resource has a corresponding antenna port, and the base station sends the CSI-RS on each CSI-RS resource by using the corresponding antenna port.

Step 203: The user equipment performs measurement on the plurality of CSI-RS resources, to obtain measurement values.

When receiving the CSI-RS on each CSI-RS resource, the user equipment uses a corresponding receive beam, and may use different receive beams on different CSI-RS resources.

The user equipment measures the received CSI-RS, to obtain the measurement values.

The measurement values each may include at least one piece of the following information: reference signal received power (RSRP), an RSRP quantized value, a channel quality indicator (CQI), a signal to interference plus noise ratio (SINR), an SINR quantized value, a precoding matrix indicator (PMI), a rank indicator (RI), a layer indicator (Layer indicator, LI), a received signal strength indicator (RSSI), and the like.

Optionally, the user equipment may feed back some or all of the measurement values to the base station. When feeding back the measurement values, the user equipment may further feed back identifiers of CSI-RS resources corresponding to the measurement values, for example, CSI-RS resource indicators (CRI).

Step 204: The base station sends first indication information to the user equipment, where the first indication information indicates a first CSI-RS resource.

The first indication information may further indicate a quasi co-location (QCL) type, and the QCL type includes a spatial receive end parameter. The base station transmits the CSI-RS on a first resource by using a first antenna port, and the user equipment receives the CSI-RS by using a first receive beam. The base station indicates the first CSI-RS resource and the QCL type, to indicate the user equipment to receive a subsequent signal and/or channel by still using the first receive beam.

Optionally, the first CSI-RS resource may be one or more CSI-RS resources.

Optionally, the base station may select the first CSI-RS resource based on the measurement values fed back by the UE, or based on another criterion.

Step 205: The user equipment determines a second CSI-RS resource, where the second CSI-RS resource and the first CSI-RS resource belong to the same CSI-RS resource set configured by the base station, and the first CSI-RS resource and the second CSI-RS resource are used to transmit the CSI-RS.

Optionally, when selecting the second CSI-RS resource, the user equipment may select a CSI-RS resource corresponding to a best channel state, that is, a CSI-RS resource with an optimal measurement value. For example, the user equipment selects a CSI-RS resource with best RSRP. In this case, a receive beam used by the user equipment is most advantageous to receiving a signal and/or channel. The user equipment may determine the second CSI-RS resource based on the CQI obtained through measurement, or may determine the second CSI-RS resource based on the CQI and/or the RI obtained through measurement.

Optionally, the base station sends the CSI-RS on the CSI-RS resources in the CSI-RS resource set, the user equipment measures the sent CSI-RS, and the second CSI-RS resource and the first CSI-RS resource belong to the same CSI-RS resource set. This helps the user equipment to select a proper CSI-RS resource.

Optionally, when the CSI resource setting corresponds to one CSI-RS resource set, the second CSI-RS resource and the first CSI-RS resource belong to a same CSI resource setting. When the CSI resource setting corresponds to one CSI-RS resource set, and one CSI resource setting corresponds to one CSI reporting setting, the second CSI-RS resource and the first CSI-RS resource correspond to a same CSI reporting setting.

Step 206: The base station sends a second signal and/or channel to the terminal device on a third resource by using a third antenna port, where the third antenna port has a quasi co-location (quasi co-location, QCL) relationship with a second antenna port used when the CSI-RS is transmitted on the second CSI-RS resource.

Optionally, a type of the QCL relationship may be the QCL type indicated by the first indication information.

When the QCL type includes the spatial receive end parameter, the user equipment selects the second CSI-RS resource, and the third antenna port has the QCL relationship with the second antenna port, so that a receive beam to be used when the user equipment receives the second signal and/or channel is the same as a receive beam used when the user equipment receives the CSI-RS transmitted on the second CSI-RS resource by using the second antenna port. Optionally, the foregoing step 206 may alternatively be expressed as: The user equipment receives a second signal and/or channel by using a receive beam that is the same as a receive beam used when the user equipment receives the CSI-RS transmitted on the second CSI-RS resource by using the second antenna port.

Optionally, the base station may indicate, to the user equipment, antenna ports that have the QCL relationship with the second antenna port.

Optionally, the second signal and/or channel may be a demodulation reference signal (Demodulation Reference Signal, DMRS), a physical downlink shared channel (Physical Downlink Shared Channel, PDSCH), a physical downlink control channel (Physical Downlink Control Channel, PDCCH), a control resource set (control resource set, CORESET), another downlink reference signal such as a CSI-RS or a phase tracking reference signal (phase tracking reference signal, PT-RS), or the like.

In the foregoing embodiment, steps 201 to 203 are optional steps.

In the foregoing solution, the user equipment autonomously selects a downlink reference signal (such as the CSI-RS) resource, and uses, during subsequent information transmission, an antenna port that has the QCL relationship with an antenna port corresponding to the autonomously selected CSI-RS resource. This improves information receiving performance.

In the foregoing solution, optionally, that the base station sends, to the user equipment, the first indication information that indicates the first CSI-RS resource may be implemented in a plurality of manners. The following provides descriptions by using examples.

Implementation 1:

The base station sends, to the user equipment, transmission configuration indicator (Transmission Configuration Indicator, TCI) configuration information that indicates a TCI state set to the terminal, and the TCI state corresponds to or indicates at least one resource of a first downlink reference signal.

The base station sends TCI indication information to the user equipment, the TCI indication information indicates one TCI state in the TCI state set, and the TCI state corresponds to or indicates the foregoing first resource.

Implementation 2:

The base station sends, to the user equipment, transmission configuration indicator (Transmission Configuration Indicator, TCI) configuration information that indicates a TCI state set to the terminal, and the TCI state corresponds to or indicates at least one resource of a first downlink reference signal.

The base station sends, to the user equipment, TCI subset indication information that indicates a subset of the TCI state set to the user equipment.

The base station sends TCI indication information to the user equipment, the TCI indication information indicates one TCI state in the TCI state subset, and the TCI state corresponds to or indicates the foregoing first resource.

Optionally, the TCI indication information in the implementations 1 and 2 may further indicate QCL information of the third resource, and the QCL information includes information about the QCL type, and information about a reference signal transmitted on an antenna port that has the QCL relationship with the antenna port used when the second channel and/or signal are/is transmitted on the third resource or information about a resource of the reference signal.

The configuration information or the indication information may be carried in media access control control element (Media Access Control Control Element, MAC CE) signaling, radio resource control (Radio Resource Control, RRC) signaling, or downlink control information (Downlink Control Information, DCI). Optionally, the TCI configuration information is carried in the RRC signaling, and the TCI subset indication information or the TCI indication information is carried in the MAC CE signaling or the DCI.

In the foregoing implementations, one TCI state may include one or more downlink reference signal (such as the CSI-RS) resource identifiers and/or one or more QCL types.

Different QCL types may include different parameters, such as:

QCL-Type A: {Doppler shift, Doppler spread, average delay, delay spread};
QCL-Type B: {Doppler shift, Doppler spread};
QCL-Type C: {Doppler shift, average delay};
QCL-Type D: {Spatial receive end parameter}.

In the TCI state, the downlink reference signal resource identifier may include an identifier of the CSI-RS resource set and a CSI-RS resource identifier of the CSI-RS in the CSI-RS resource set, or may include only a unified CSI-RS resource identifier, and the unified CSI-RS resource identifier may uniquely identify one CSI-RS resource in one or more CSI-RS resource sets.

In this embodiment of the present invention, optionally, before sending the second signal and/or channel to the terminal device on the third CSI-RS resource by using the third antenna port, the base station may send the CSI-RS on the CSI-RS resources for a plurality of times. Specifically, that the user equipment performs channel measurement and selects the second CSI-RS resource based on a transmitted CSI-RS may be implemented in a plurality of manners, for example:

The user equipment performs channel measurement and selects the second CSI-RS based on a CSI-RS last transmitted or measured by the user equipment on the second resource before the user equipment receives the TCI configuration information, and the third antenna port has the QCL relationship with an antenna port used when the user equipment last transmits or measures the CSI-RS on the second resource before the user equipment receives the TCI configuration information.

Alternatively, the user equipment performs channel measurement and selects the second CSI-RS based on a CSI-RS last transmitted or measured by the user equipment on the second resource before the user equipment receives the TCI indication information, and the third antenna port has the QCL relationship with an antenna port used when the user equipment last transmits or measures the CSI-RS on the second resource before the user equipment receives the TCI indication information.

Alternatively, the user equipment performs channel measurement and selects the second CSI-RS based on a CSI-RS last transmitted or measured by the user equipment on the second resource before the user equipment receives the second signal and/or channel, and the third antenna port has the QCL relationship with an antenna port used when the user equipment last transmits or measures the CSI-RS on the second resource before the user equipment receives the second signal and/or channel.

Optionally, the user equipment may alternatively perform channel measurement and select the second CSI-RS resource based on a CSI-RS transmitted for the $K^{th}$ time by the user equipment on the second resource before the user equipment receives the TCI configuration information, a CSI-RS transmitted for the $K^{th}$ time by the user equipment on the second resource before the user equipment receives the TCI indication information, or a CSI-RS transmitted for the $K^{th}$ time by the user equipment on the second resource before the user equipment receives the second signal and/or channel, where K is an integer greater than or equal to 1.

Optionally, one of the foregoing implementations may be predefined to be used, or configuration information of the base station is used to determine to use one of the foregoing implementations.

In the foregoing embodiment, an example in which the downlink reference signal is the CSI-RS is used to describe the solutions in the embodiments of the present invention. The downlink reference signal may alternatively be replaced with a synchronization signal block (Synchronizing Signal/Physical Broadcast Channel Block, SSB), and the corresponding CSI-RS resource is replaced with an SSB resource. Specific solution steps are similar to those described in the foregoing embodiment, and details are not described herein again.

In the foregoing embodiment, optionally, after step 204, when at least one of the following conditions is met, steps 205 and 206 are performed.

Condition 1: In last TCI state configuration, a parameter CSI-RS-ResourceRep of the resource set to which the downlink reference signal (for example, the CSI-RS) resource belongs is set to ON. To be specific, the network device sends the reference signal on the resources in the resource set by using same transmit beams or same spatial domain transmission filters, or the user equipment may consider that the network device sends the reference signal on the resources in the resource set by using same transmit beams or same spatial domain transmission filters.

Condition 2: The parameter CSI-RS-ResourceRep is set to ON, and the QCL type is the type D.

Condition 3: The UE does not report the CSI-RS resource indicator CRI (CSI-RS Resource Indicator) after measuring the resource set.

Condition 4: The UE does not report the CRI after measuring the resource set, and the QCL type is the type D.

Condition 5: A parameter ReportQuantity of the UE is set to no report No Report. That is, the user equipment does not perform any reporting after measuring the CSI-RS.

Condition 6: The parameter ReportQuantity of the UE is set to no report No Report, and the QCL type is the type D.

When the foregoing conditions are not met, step 207 is performed.

Step 207: The base station sends the second signal and/or channel to the terminal device on a fourth resource by using a fourth antenna port, and the fourth antenna port has the QCL relationship with the first antenna port used when the CSI-RS is transmitted on the first CSI-RS resource.

Optionally, the third resource may be the same as the fourth resource. The third resource or the fourth resource may be allocated by the base station to the user equipment.

To be specific, when at least one of the foregoing conditions is met, the user equipment selects a better resource or receive beam to transmit information, or the user equipment independently determines a QCL assumption of the antenna port to be used when the user equipment transmits the second signal and/or channel on the third resource. When the foregoing conditions are not met, the user equipment transmits information by using a corresponding resource indicated by the base station.

Optionally, in the foregoing embodiment, steps 205 and 206 may alternatively be that the user equipment independently determines the QCL assumption of the third antenna port to be used when the user equipment transmits the second signal and/or channel on the third resource. The QCL assumption may include the QCL type, an antenna port, of a CSI-RS resource, with which the third antenna port has the QCL relationship, and the like. For example, the third antenna port that is determined by the user equipment and that is to be used when the user equipment transmits the second signal and/or channel on the third resource has the QCL relationship with an antenna port used when the CSI-RS is transmitted on a CSI-RS resource (such as the foregoing second CSI-RS resource) in the CSI-RS resource set to which the first CSI-RS resource belongs.

Optionally, when determining the QCL assumption, the user equipment may determine that the third antenna port to be used when the user equipment transmits the second signal and/or channel on the third resource has the QCL relationship with an antenna port used when the CSI-RS is transmitted on a CSI-RS resource with a best channel state in the CSI-RS resource set to which the first CSI-RS resource belongs. The CSI-RS resource with the best channel state in the CSI-RS resource set to which the first CSI-RS resource belongs is a CSI-RS resource with an optimal measurement value. For example, the user equipment selects a CSI-RS resource with best RSRP. In this case, a receive beam used by the user equipment is most advantageous to receiving a signal and/or channel.

Optionally, when the CSI resource setting corresponds to one CSI-RS resource set, the second CSI-RS resource and the first CSI-RS resource belong to a same CSI resource setting. When the CSI resource setting corresponds to one CSI-RS resource set, and one CSI resource setting corresponds to one CSI reporting setting, the second CSI-RS resource and the first CSI-RS resource correspond to a same CSI reporting setting.

The foregoing embodiment is a solution to selecting a resource, an antenna port, or a beam for downlink transmission. The following further provides an embodiment related to uplink transmission.

Figure 3:
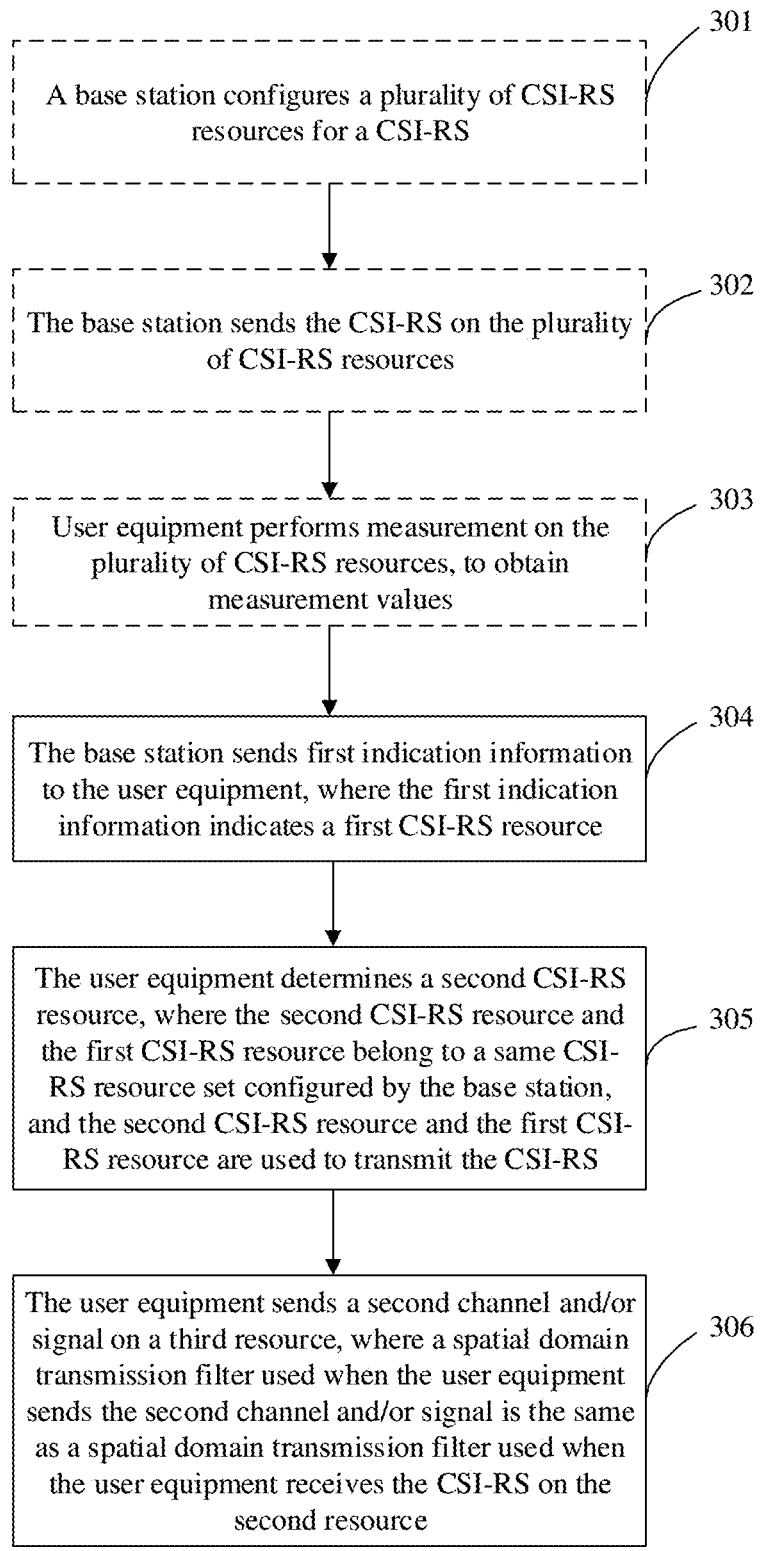
FIG. 3 is a flowchart of another communication method according to an embodiment of the present invention.

The following describes the method by using an example in which a base station communicates with a terminal, and a downlink reference signal is a CSI-RS. As shown in FIG. 3, an embodiment of the present invention provides a communication method, including the following steps.

Step 301: The base station configures a plurality of CSI-RS resources for the CSI-RS.

Step 302: The base station sends the CSI-RS on the plurality of CSI-RS resources.

Step 303: The user equipment performs measurement on the plurality of CSI-RS resources, to obtain measurement values.

Step 304: The base station sends first indication information to the user equipment, where the first indication information indicates a first CSI-RS resource.

Step 305: The user equipment determines a second CSI-RS resource, where the second CSI-RS resource and the first CSI-RS resource belong to a same CSI-RS resource set configured by the base station, and the second CSI-RS resource and the first CSI-RS resource are used to transmit the CSI-RS.

Step 306: The user equipment sends a second channel and/or signal on a third resource, where a spatial domain transmission filter (spatial domain transmission filter) used when the user equipment sends the second channel and/or signal is the same as a spatial domain transmission filter used when the user equipment receives the CSI-RS on the second resource.

In step 306, it may alternatively be considered that a transmit beam (the spatial domain transmission filter) used when the user equipment sends the second channel and/or signal is reciprocal to (the same as) a receive beam (the spatial domain transmission filter) used when the user equipment receives the CSI-RS on the second CSI-RS resource. To be specific, the user equipment may determine, based on the receive beam or the spatial domain transmission filter on the second CSI-RS resource, the beam or the spatial domain transmission filter to be used when the user equipment sends the second channel and/or signal on the third resource.

In the foregoing solution, for steps 301 to 303, refer to steps 201 to 203 in the foregoing embodiment, and details are not described again. Steps 301 to 303 are optional steps.

In the foregoing solution, the user equipment autonomously selects a downlink reference signal (such as the CSI-RS) resource, and uses, during subsequent information sending, a spatial domain transmission filter that is the same as a spatial domain transmission filter used when the user equipment receives the downlink reference signal on the selected downlink reference signal resource. This improves information transmission performance.

In step 304, that the base station sends first indication information to the user equipment may be implemented in a plurality of manners, for example:

The base station sends, to the user equipment, first configuration information that indicates the CSI-RS resource set to the user equipment.

The user equipment receives second configuration information from the network device, where the second configuration information indicates one or more CSI-RS resources in the CSI-RS resource set.

Optionally, the first indication information may include an identifier of the CSI-RS resource set and a CSI-RS resource identifier of the CSI-RS in the CSI-RS resource set, or may include only a unified CSI-RS resource identifier, and the unified CSI-RS resource identifier may uniquely identify one CSI-RS resource in one or more CSI-RS resource sets.

Optionally, the base station may select the first CSI-RS resource based on the measurement values fed back by the UE, or based on another criterion.

In step 305, when selecting the second CSI-RS resource, the user equipment may select a CSI-RS resource with a best channel state, that is, a CSI-RS resource with an optimal measurement value. For example, the user equipment selects a CSI-RS resource with best RSRP. The user equipment may determine the second CSI-RS resource based on a CQI, or may determine the second CSI-RS resource based on a CQI and/or an RI.

Optionally, when a CSI-RS resource setting corresponds to one CSI-RS resource set, the second CSI-RS resource and the first CSI-RS resource belong to a same CSI-RS resource setting. When the CSI-RS resource setting corresponds to one CSI-RS resource set, and one CSI-RS resource setting corresponds to one CSI-RS reporting setting, the second CSI-RS resource and the first CSI-RS resource belong to a same CSI-RS reporting setting.

In step 306, the second channel and/or signal may be a physical uplink shared channel (PUSCH), a physical uplink control channel (PUCCH), a physical random access channel (PRACH), or an uplink reference signal such as a sounding reference signal (SRS), a DMRS, a PT-RS, or the like.

In the foregoing solution, the user equipment determines the second CSI-RS resource, and further determines an uplink transmission resource. This improves uplink transmission performance.

In the foregoing solution, before the user equipment sends the second channel and/or signal on the third resource, the base station may send the CSI-RS on the CSI-RS resources for a plurality of times. Specifically, that the user equipment performs channel measurement and selects the second CSI-RS resource based on a transmitted CSI-RS may be implemented in a plurality of manners, for example:

The user equipment performs channel measurement and selects the second CSI-RS resource based on a CSI-RS last transmitted or measured by the user equipment on the second resource before the user equipment receives the first configuration information, and the spatial domain transmission filter used when the user equipment sends the second channel and/or signal is the same as a spatial domain transmission filter used when the user equipment last transmits or measures the first downlink reference signal on the second resource before the user equipment receives the first configuration information.

Alternatively, the user equipment performs channel measurement and selects the second CSI-RS resource based on a CSI-RS last transmitted or measured by the user equipment on the second resource before the user equipment receives the second configuration information, and the spatial domain transmission filter used when the user equipment sends the second channel and/or signal is the same as a spatial domain transmission filter used when the user equipment last transmits or measures the first downlink reference signal on the second resource before the user equipment receives the second configuration information.

Alternatively, the user equipment performs channel measurement and selects the second CSI-RS resource based on a CSI-RS last transmitted or measured by the user equipment on the second resource before the user equipment sends the second signal and/or channel, and the spatial domain transmission filter used when the user equipment sends the second channel and/or signal is the same as a spatial domain transmission filter used when the user equipment last transmits or measures the first downlink reference signal on the second resource before the user equipment sends the second channel and/or signal.

Optionally, the user equipment may alternatively perform channel measurement and select the second CSI-RS resource based on a CSI-RS transmitted for the $K^{th}$ time by the user equipment on the second resource before the user equipment receives the first configuration information, a CSI-RS transmitted for the $K^{th}$ time by the user equipment on the second resource before the user equipment receives the second configuration information, or a CSI-RS received for the $K^{th}$ time by the user equipment on the second resource before the user equipment sends the second signal and/or channel, where K is an integer greater than or equal to 1.

Optionally, one of the foregoing implementations may be predefined to be used, or configuration information of the base station is used to determine to use one of the foregoing implementations.

In the foregoing embodiment, an example in which the downlink reference signal is the CSI-RS is used to describe the solutions in the embodiments of the present invention. The downlink reference signal may alternatively be replaced with a synchronization signal block SSB, and the corresponding CSI-RS resource is replaced with an SSB resource. Specific solution steps are similar to those described in the foregoing embodiment, and details are not described herein again. The CSI-RS may alternatively be replaced with an uplink reference signal such as a sounding reference signal (Sounding Reference Signal, SRS). Correspondingly, steps 301 to 303 are replaced with that: The base station configures SRS resources, and the base station receives an SRS and performs measurement. Steps 304 and 305 are replaced with that: The base station indicates a first SRS resource, and the user equipment determines a second SRS resource.

In the foregoing embodiment, optionally, after step 304, when at least one of the following conditions is met, steps 305 and 306 are performed.

Condition 1: In last TCI state configuration, a parameter CSI-RS-ResourceRep of the resource set to which the downlink reference signal (for example, the CSI-RS) resource belongs is set to ON. To be specific, the network device sends the reference signal on the resources in the resource set by using same transmit beams or same spatial domain transmission filters, or the user equipment may consider that the network device sends the reference signal on the resources in the resource set by using same transmit beams or same spatial domain transmission filters.

Condition 2: The parameter CSI-RS-ResourceRep is set to ON, and a QCL type is a type D.

Condition 3: The UE does not report a CSI-RS resource indicator CRI (CSI-RS Resource Indicator) after measuring the resource set.

Condition 4: The UE does not report a CRI after measuring the resource set, and the QCL type is the type D.

Condition 5: A parameter ReportQuantity of the UE is set to no report No Report. That is, the user equipment does not perform any reporting after measuring the CSI-RS.

Condition 6: The parameter ReportQuantity of the UE is set to no report No Report, and the QCL type is the type D.

When the foregoing conditions are not met, step 307 is performed.

Step 307: The user equipment sends the second channel and/or signal on a fourth resource, where the spatial domain transmission filter used when the user equipment sends the second channel and/or signal is the same as a spatial domain transmission filter used when the user equipment receives the CSI-RS on the first resource.

Optionally, the fourth resource is the same as the third resource. The third resource or the fourth resource may be allocated by the base station to the user equipment.

To be specific, when at least one of the foregoing conditions is met, the user equipment selects a better resource or transmit beam to transmit information, or the user equipment independently determines a QCL assumption of the antenna port to be used when the user equipment transmits the second signal and/or channel on the third resource. When the foregoing conditions are not met, the user equipment performs uplink transmission by using a corresponding resource indicated by the base station.

Optionally, in the foregoing embodiment, steps 305 and 306 may alternatively be that the user equipment independently determines a transmit beam or a spatial domain transmission filter to be used when the user equipment transmits the second signal and/or channel on the third resource. For example, the spatial domain transmission filter that is determined by the user equipment and that is to be used when the user equipment sends the second signal and/or channel on the third resource is the same as a spatial domain transmission filter used when the user equipment receives the CSI-RS on a CSI-RS resource (such as the foregoing second CSI-RS resource) in the CSI-RS resource set to which the first CSI-RS resource belongs. It may alternatively be considered that the beam that is determined by the user equipment and that is to be used when the user equipment sends the second signal and/or channel on the third resource is reciprocal to (the same as) a beam used when the user equipment receives the CSI-RS on the CSI-RS resource (such as the foregoing second CSI-RS resource) in the CSI-RS resource set to which the first CSI-RS resource belongs.

Optionally, when determining the beam or the spatial domain transmission filter, the user equipment may determine that the spatial domain transmission filter to be used when the user equipment sends the second signal and/or channel on the third resource is the same as a spatial domain transmission filter used when the user equipment receives the CSI-RS on a CSI-RS resource with the best channel state in the CSI-RS resource set to which the first CSI-RS resource belongs. The CSI-RS resource with the best channel state in the CSI-RS resource set to which the first CSI-RS resource belongs is a CSI-RS resource with an optimal measurement value. For example, the user equipment selects a CSI-RS resource with best RSRP. In this case, a receive beam used by the user equipment is most advantageous to receiving a signal and/or channel. It may alternatively be considered that the beam to be used when the user equipment sends the second signal and/or channel on the selected third resource is reciprocal to a beam used when the user equipment receives the CSI-RS on the CSI-RS resource with the best channel state in the CSI-RS resource set to which the first CSI-RS resource belongs.

Optionally, when the CSI resource setting corresponds to one CSI-RS resource set, the second CSI-RS resource and the first CSI-RS resource belong to a same CSI resource setting. When the CSI resource setting corresponds to one CSI-RS resource set, and one CSI resource setting corresponds to one CSI reporting setting, the second CSI-RS resource and the first CSI-RS resource correspond to a same CSI reporting setting.

The embodiments of the present invention further provide apparatus embodiments for implementing the steps and method in the foregoing method embodiments. The method, steps, technical details, technical effects, and the like in the foregoing method embodiments are also applicable to the apparatus embodiments. The following provides only brief descriptions of the apparatus embodiments. For specific technical details, refer to the foregoing method embodiments.

Figure 4:
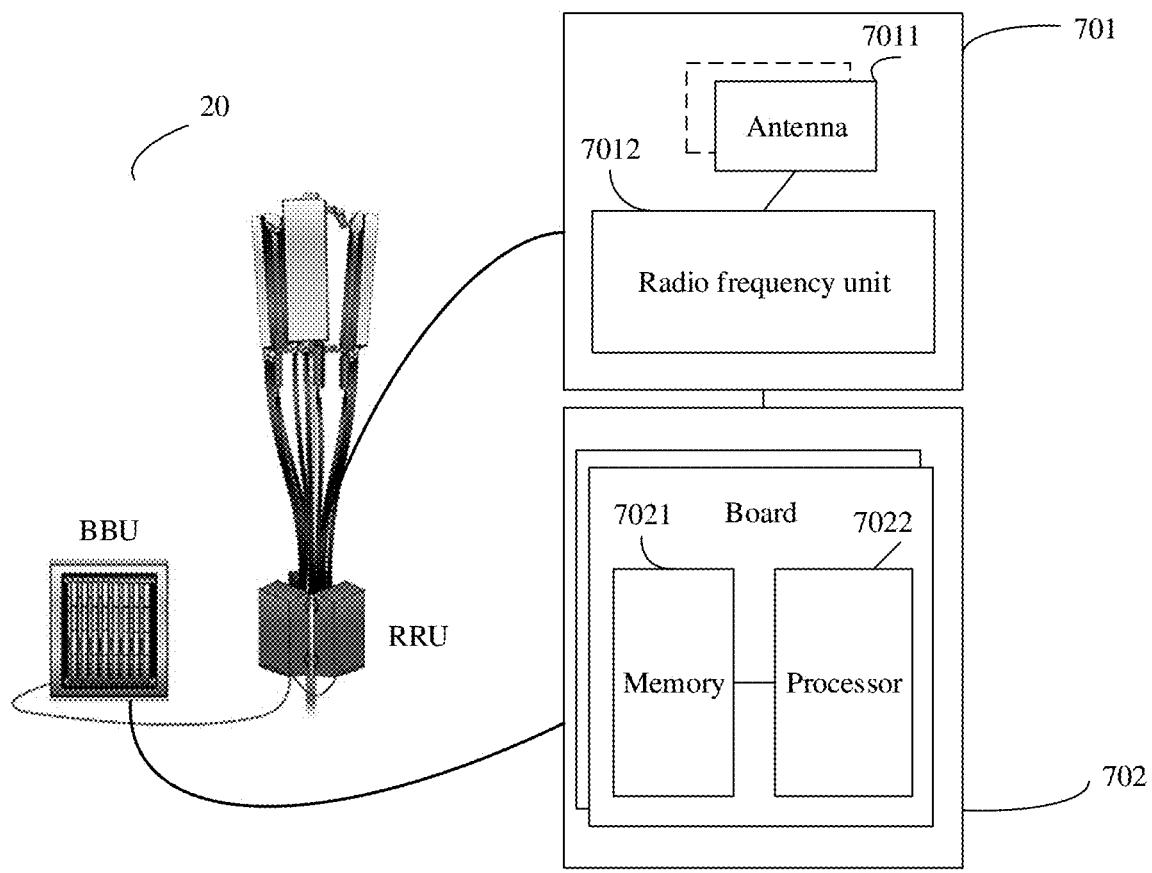
FIG. 4 is a schematic structural diagram of a network device according to an embodiment of the present invention.

FIG. 4 is a schematic structural diagram of a network device. The network device may be applied to the system shown in FIG. 1. A network device 20 includes one or more remote radio units (remote radio unit, RRU) 701 and one or more baseband units (baseband unit, BBU) 702. The RRU 701 may be referred to as a transceiver unit, a transceiver machine, a transceiver circuit, a transceiver, or the like, and may include at least one antenna 7011 and a radio frequency unit 7012. The RRU 701 is mainly configured to: send and receive a radio frequency signal, and perform conversion between the radio frequency signal and a baseband signal, for example, configured to send the signaling indicator or the reference signal in the foregoing embodiments to a terminal. The BBU 702 is mainly configured to: perform baseband processing, control the network device, and the like. The RRU 701 and the BBU 702 may be physically disposed together, or may be physically separated, that is, in a distributed base station.

The BBU 702 is a control center of the network device, or may be referred to as a processing unit, and is mainly configured to complete baseband processing functions such as channel coding, multiplexing, modulation, and spread spectrum. In an example, the BBU 702 may include one or more boards, and a plurality of boards may jointly support a radio access network (such as a 5G network) in a single access standard, or may separately support radio access networks in different access standards. The BBU 702 further includes a memory 7021 and a processor 7022. The memory 7021 is configured to store an instruction and data that are necessary. The processor 7022 is configured to control the network device to perform a necessary action. The memory 7021 and the processor 7022 may serve the one or more boards. In other words, the memory and the processor may be independently disposed on each board. Alternatively, a plurality of boards may share a same memory and processor. In addition, a necessary circuit is further disposed on each board.

In an actual system, the network device may have a simplified structure, for example, may include only a processor, a transceiver, and the like.

The network device may be configured to implement the method in the foregoing method embodiments. For the solution corresponding to FIG. 2, details are as follows:

A processor is configured to generate first indication information, where the first indication information indicates a first resource.

A transmitter is configured to send the first indication information to user equipment, so that the user equipment determines a second resource, where the second resource and the first resource belong to a same resource set configured by the network device, and the first resource and the second resource are used to transmit a first downlink reference signal.

The transmitter is further configured to send a second signal and/or channel to the user equipment on a third resource by using a third antenna port, where the third antenna port has a quasi co-location QCL relationship with a second antenna port used when the first downlink reference signal is transmitted on the second resource.

Optionally, the first indication information is further used to indicate a QCL type, the QCL type includes a spatial receive end parameter, and a type of the QCL relationship is the QCL type.

Optionally, that the transmitter sends the first indication information to the user equipment includes: the transmitter is configured to send, to the user equipment, transmission configuration indicator TCI configuration information that indicates a TCI state set to the user equipment, where the TCI state corresponds to at least one resource of the first downlink reference signal; and the transmitter is further configured to send TCI indication information to the user equipment, where the TCI indication information indicates one TCI state in the TCI state set, and the TCI state corresponds to the first resource.

Optionally, the first indication information includes an identifier of the resource set to which the first resource belongs and a resource identifier of the first resource in the resource set.

Optionally, that the third antenna port has a QCL relationship with the second antenna port includes: the third antenna port has the QCL relationship with an antenna port used when the user equipment last transmits or measures the first downlink reference signal on the second resource before the user equipment receives the TCI configuration information; the third antenna port has the QCL relationship with an antenna port used when the user equipment last transmits or measures the first downlink reference signal on the second resource before the user equipment receives the TCI indication information; or the third antenna port has the QCL relationship with an antenna port used when the user equipment last transmits or measures the first downlink reference signal on the second resource before the user equipment receives the second signal and/or channel.

The network device may be further configured to implement the solution corresponding to FIG. 3 in the foregoing method embodiments. Details are as follows:

A transmitter is configured to send first indication information to user equipment, where the first indication information indicates a first resource, so that the user equipment determines a second resource, the second resource and the first resource belong to a same resource set configured by the base station, and the second resource and the first resource are used to transmit a first downlink reference signal.

A receiver is configured to receive a second channel and/or signal sent by the user equipment on a third resource, where a spatial domain transmission filter used when the user equipment sends the second channel and/or signal is the same as a spatial domain transmission filter used when the user equipment receives the first downlink reference signal on the second resource.

Optionally, that the transmitter sends the first indication information to the user equipment includes: the transmitter is configured to send, to the user equipment, first configuration information that indicates the resource set of the first downlink reference signal to the user equipment; and the transmitter is further configured to send second configuration information to the user equipment, where the second configuration information indicates the first resource in the resource set.

Optionally, the second configuration information includes an identifier of the resource set and a resource identifier of the first downlink reference signal in the resource set.

Optionally, that a spatial domain transmission filter used when the user equipment sends the second channel and/or signal is the same as a spatial domain transmission filter used when the user equipment receives the first downlink reference signal on the second resource includes: the spatial domain transmission filter used when the user equipment sends the second channel and/or signal is the same as a spatial domain transmission filter used when the user equipment last transmits or measures the first downlink reference signal on the second resource before the user equipment receives the first configuration information; the spatial domain transmission filter used when the user equipment sends the second channel and/or signal is the same as a spatial domain transmission filter used when the user equipment last transmits or measures the first downlink reference signal on the second resource before the user equipment receives the second configuration information; or the spatial domain transmission filter used when the user equipment sends the second channel and/or signal is the same as a spatial domain transmission filter used when the user equipment last transmits or measures the first downlink reference signal on the second resource before the user equipment sends the second channel and/or signal.

Figure 5:
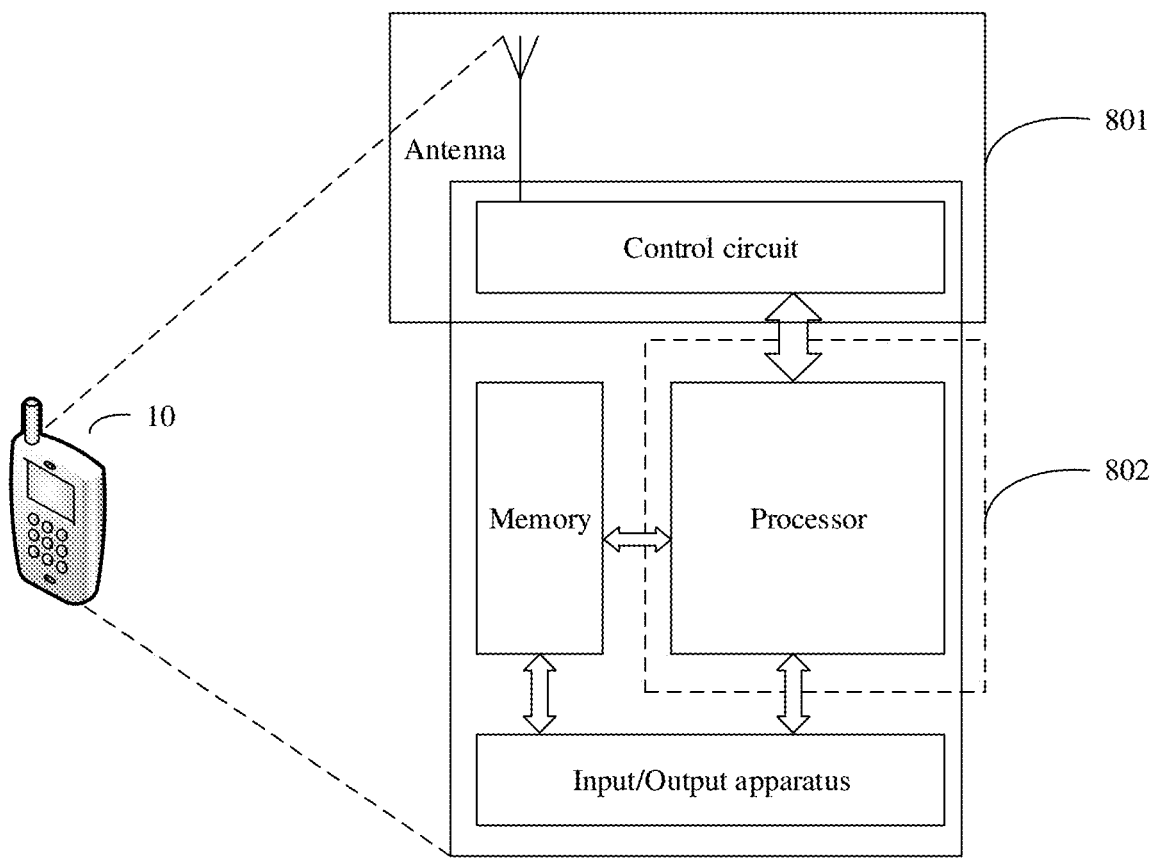
FIG. 5 is a schematic structural diagram of a terminal according to an embodiment of the present invention.

FIG. 5 is a schematic structural diagram of a terminal. The terminal may be applicable to the system shown in FIG. 1. For ease of description, FIG. 5 shows only main components of the terminal. As shown in FIG. 5, a terminal 10 includes a processor, a memory, a control circuit or an antenna, and an input/output apparatus. The processor is mainly configured to: process a communication protocol and communication data, control the entire terminal, execute a software program, and process data of the software program. The memory is mainly configured to store the software program and data, for example, store the codebook described in the foregoing embodiments. The control circuit is mainly configured to: perform conversion between a baseband signal and a radio frequency signal, and process the radio frequency signal. A combination of the control circuit and the antenna may also be referred to as a transceiver that is mainly configured to send and receive a radio frequency signal in an electromagnetic wave form. The input/output apparatus, such as a touchscreen, a display, or a keyboard, is mainly configured to: receive data entered by a user, and output data to the user.

After the terminal is powered on, the processor may read the software program in a storage unit, interpret and execute an instruction of the software program, and process the data of the software program. When data needs to be sent in a wireless manner, the processor performs baseband processing on the to-be-sent data, and outputs a baseband signal to a radio frequency circuit. After performing radio frequency processing on the baseband signal, the radio frequency circuit sends a radio frequency signal by using the antenna in the electromagnetic wave form. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 5 shows only one memory and only one processor. An actual terminal may include a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process the communication protocol and communication data, and the central processing unit is mainly configured to: control the entire terminal, execute the software program, and process the data of the software program. The processor in FIG. 5 integrates functions of the baseband processor and the central processing unit. A person skilled in the art may understand that the baseband processor and the central processing unit may be separate processors, and are interconnected by using a technology such as a bus. A person skilled in the art may understand that the terminal may include a plurality of baseband processors to adapt to different network standards, and the terminal may include a plurality of central processing units to enhance a processing capability of the terminal. Components in the terminal may be connected by using various buses. The baseband processor may alternatively be expressed as a baseband processing circuit or a baseband processing chip. The central processing unit may alternatively be expressed as a central processing circuit or a central processing chip. A function of processing the communication protocol and communication data may be embedded into the processor, or may be stored in the storage unit in a software program form. The processor executes the software program, to implement the baseband processing function.

For example, in this embodiment of the present invention, the antenna and the control circuit that have sending and receiving functions may be considered as a transceiver unit 801 of the terminal 10, and the processor having a processing function may be considered as a processing unit 802 of the terminal 10. As shown in FIG. 5, the terminal 10 includes the transceiver unit 801 and the processing unit 802. The transceiver unit may also be referred to as a transceiver, a transceiver machine, a transceiver apparatus, or the like. Optionally, a component configured to implement the receiving function in the transceiver unit 801 may be considered as a receiving unit, and a component configured to implement the sending function in the transceiver unit 801 may be considered as a sending unit. That is, the transceiver unit 801 includes the receiving unit and the sending unit. For example, the receiving unit may also be referred to as a receiving machine, a receiver, a receiving circuit, or the like. The sending unit may be referred to as a transmitting machine, a transmitter, a transmitting circuit, or the like.

The user equipment may be configured to implement the method in the foregoing method embodiments. For the solution corresponding to FIG. 2, details are as follows:

A receiver is configured to receive first indication information from a network device, where the first indication information indicates a first resource.

A processor is configured to determine a second resource, where the second resource and the first resource belong to a same resource set configured by the network device, and the first resource and the second resource are used to transmit a first downlink reference signal.

The receiver is further configured to receive, on a third resource, a second signal and/or channel transmitted by using a third antenna port, where the third antenna port has a quasi co-location QCL relationship with a second antenna port used when the first downlink reference signal is transmitted on the second resource.

Optionally, the first indication information is further used to indicate a QCL t e, the QCL type includes a spatial receive end parameter, and a type of the QCL relationship is the QCL type.

Optionally, that the receiver is configured to receive first indication information from the network device includes: the receiver is configured to receive, from the network device, transmission configuration indicator TCI configuration information that indicates a TCI state set to the user equipment, where the TCI state corresponds to at least one resource of the first downlink reference signal; and the receiver is further configured to receive TCI indication information from the network device, where the TCI indication information indicates one TCI state in the TCI state set, and the TCI state corresponds to the first resource.

Optionally, the first indication information includes an identifier of the resource set to which the first resource belongs and a resource identifier of the first resource in the resource set.

Optionally, that the third antenna port has a QCL relationship with the second antenna port includes: the third antenna port has the QCL relationship with an antenna port used when the user equipment last transmits or measures the first downlink reference signal on the second resource before the user equipment receives the TCI configuration information; the third antenna port has the QCL relationship with an antenna port used when the user equipment last transmits or measures the first downlink reference signal on the second resource before the user equipment receives the TCI indication information; or the third antenna port has the QCL relationship with an antenna port used when the user equipment last transmits or measures the first downlink reference signal on the second resource before the user equipment receives the second signal and/or channel.

The user equipment may be further configured to implement the method corresponding to FIG. 3 in the foregoing method embodiments. Details are as follows:

A receiver is configured to receive first indication information from a network device, where the first indication information indicates a first resource.

A processor is configured to determine a second resource, where the second resource and the first resource belong to a same resource set configured by the base station, and the second resource and the first resource are used to transmit a first downlink reference signal.

A transmitter is configured to send a second channel and/or signal on a third resource, where a spatial domain transmission filter used when the user equipment sends the second channel and/or signal is the same as a spatial domain transmission filter used when the user equipment receives the first downlink reference signal on the second resource.

Optionally, that the receiver is configured to receive first indication information from a network device includes: the receiver is configured to receive, from the network device, first configuration information that indicates the resource set of the first downlink reference signal to the user equipment; and the receiver is further configured to receive second configuration information from the network device, where the second configuration information indicates the first resource in the resource set.

Optionally, the second configuration information includes an identifier of the resource set and a resource identifier of the first downlink reference signal in the resource set.

Optionally, that a spatial domain transmission filter used when the user equipment sends the second channel and/or signal is the same as a spatial domain transmission filter used when the user equipment receives the first downlink reference signal on the second resource includes: the spatial domain transmission filter used when the user equipment sends the second channel and/or signal is the same as a spatial domain transmission filter used when the user equipment last transmits or measures the first downlink reference signal on the second resource before the user equipment receives the first configuration information; the spatial domain transmission filter used when the user equipment sends the second channel and/or signal is the same as a spatial domain transmission filter used when the user equipment last transmits or measures the first downlink reference signal on the second resource before the user equipment receives the second configuration information; or the spatial domain transmission filter used when the user equipment sends the second channel and/or signal is the same as a spatial domain transmission filter used when the user equipment last transmits or measures the first downlink reference signal on the second resource before the user equipment sends the second channel and/or signal.

It should be noted that numbers such as "first", "second", and "third" in the embodiments of the present invention are merely used to distinguish between a plurality of terms with a same name in one embodiment, and do not represent an order or a device processing order. Terms with different numbers in different embodiments may have a same meaning. Terms with a same number in different embodiments may have different meanings. A specific meaning needs to be determined based on a specific solution.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (such as a coaxial cable, an optical fiber, or a digital subscriber line (DSL)) or wireless (such as infrared, radio, or microwave) manner. The computer-readable storage medium may be any usable medium accessible by a computer, or a data storage device, such as a server or a data center, integrating one or more usable media. The usable medium may be a magnetic medium (such as a floppy disk, a hard disk, or a magnetic tape), an optical medium (such as a DVD), a semiconductor medium (such as a solid-state drive (Solid State Disk, SSD)), or the like.

What is claimed is:

1. A method, comprising:
   receiving, by user equipment, first indication information from a network device, wherein the first indication information indicates a first resource;
   determining, by the user equipment, a second resource, wherein the second resource and the first resource belong to a same resource set configured by the network device, and a first downlink reference signal is transmitted on the first resource and the second resource; and
   receiving, by the user equipment on a third resource, a second signal or channel transmitted using a third antenna port, wherein the third antenna port has a quasi co-location (QCL) relationship with a second antenna port used when the first downlink reference signal is transmitted on the second resource.

2. The method according to claim 1, wherein the first indication information further indicates a QCL type, the QCL type comprises a spatial receive end parameter, and a type of the QCL relationship is the QCL type.

3. The method according to claim 1, wherein receiving, by the user equipment, the first indication information from the network device comprises:
   receiving, by the user equipment, transmission configuration indicator (TCI) configuration information that indicates a TCI state set to the user equipment, wherein each TCI state in the TCI state set corresponds to respective resource of the first downlink reference signal; and
   receiving, by the user equipment, TCI indication information from the network device, wherein the TCI indication information indicates a first TCI state in the TCI state set, and the first TCI state corresponds to the first resource.

4. The method according to claim 3, wherein the first indication information comprises:
   an identifier of a resource set to which the first resource belongs; and
   a resource identifier of the first resource in the resource set.

5. The method according to claim 3, wherein:
   the second antenna port is an antenna port used when the user equipment last transmits or measures the first downlink reference signal on the second resource before the user equipment receives the TCI configuration information;
   the second antenna port is an antenna port used when the user equipment last transmits or measures the first downlink reference signal on the second resource before the user equipment receives the TCI indication information; or
   the second antenna port is an antenna port used when the user equipment last transmits or measures the first downlink reference signal on the second resource before the user equipment receives the second signal or channel.

6. A method, comprising:
   sending, by a network device, first indication information to user equipment, wherein the first indication information indicates a first resource, the user equipment determines a second resource according to the first resource, wherein the second resource and the first resource belong to a same resource set configured by the network device, and a first downlink reference signal is transmitted on the first resource and the second resource; and
   sending, by the network device, a second signal or channel to the user equipment on a third resource using a third antenna port, wherein the third antenna port has a quasi co-location (QCL) relationship with a second antenna port used when the first downlink reference signal is transmitted on the second resource.

7. The method according to claim 6, wherein the first indication information further indicates a QCL type, the QCL type comprises a spatial receive end parameter, and a type of the QCL relationship is the QCL type.

8. The method according to claim 6, wherein sending, by a network device, the first indication information to the user equipment comprises:
   sending, by the network device to the user equipment, transmission configuration indicator (TCI) configuration information that indicates a TCI state set to the user equipment, wherein each TCI state in the TCI state set corresponds to a respective resource of the first downlink reference signal; and
   sending, by the network device, TCI indication information to the user equipment, wherein the TCI indication information indicates a first TCI state in the TCI state set, and first the TCI state corresponds to the first resource.

9. The method according to claim 8, wherein the first indication information comprises:
   an identifier of a resource set to which the first resource belongs; and
   a resource identifier of the first resource in the resource set.

10. The method according to claim 8, wherein:
    the second antenna port is an antenna port used when the user equipment last transmits or measures the first downlink reference signal on the second resource before the user equipment receives the TCI configuration information;

the second antenna port is an antenna port used when the user equipment last transmits or measures the first downlink reference signal on the second resource before the user equipment receives the TCI indication information; or the second antenna port is an antenna port used when the user equipment last transmits or measures the first downlink reference signal on the second resource before the user equipment receives the second signal or channel.

11. User equipment, comprising:

a receiver, configured to receive first indication information from a network device, wherein the first indication information indicates a first resource; and a processor, configured to determine a second resource, wherein the second resource and the first resource belong to a same resource set configured by the network device, and a first downlink reference signal is transmitted on the first resource and the second resource, wherein the receiver is further configured to receive, on a third resource, a second signal or channel transmitted by using a third antenna port, wherein the third antenna port has a quasi co-location (QCL) relationship with a second antenna port used when the first downlink reference signal is transmitted on the second resource.

12. The user equipment according to claim 11, wherein the first indication information further indicates a QCL type, the QCL type comprises a spatial receive end parameter, and a type of the QCL relationship is the QCL type.

13. The user equipment according to claim 11, wherein:

the receiver is configured to receive, from the network device, transmission configuration indicator (TCI) configuration information that indicates a TCI state set to the user equipment, wherein each TCI state in the TCI state set corresponds to a resource of the first downlink reference signal; and the receiver is further configured to receive TCI indication information from the network device, wherein the TCI indication information indicates a first TCI state in the TCI state set, and the first TCI state corresponds to the first resource.

14. The user equipment according to claim 13, wherein the first indication information comprises:

an identifier of a resource set to which the first resource belongs; and a resource identifier of the first resource in the resource set.

15. The user equipment according to claim 13, wherein:

the second antenna port is an antenna port used when the user equipment last transmits or measures the first downlink reference signal on the second resource before the user equipment receives the TCI configuration information;

the second antenna port is an antenna port used when the user equipment last transmits or measures the first downlink reference signal on the second resource before the user equipment receives the TCI indication information; or the second antenna port is an antenna port used when the user equipment last transmits or measures the first downlink reference signal on the second resource before the user equipment receives the second signal or channel.

* * * * *